United States Patent Office 3,313,710
Patented Apr. 11, 1967

3,313,710
PROCESS FOR PRODUCING TRI- AND DIPHOSPHATES OF ADENOSINE AND GUANOSINE BY FERMENTATION
Shukuo Kinoshita, Tokyo, Kiyoshi Nakayama, Sagamihara-shi, Takashi Nara, Tokyo, Zenroku Sato, Machida-shi, and Haruo Tanaka, Tokyo, Japan, assignors to Kyowa Hakko Kogyo Co., Ltd., Tokyo, Japan, a corporation of Japan
No Drawing. Filed Oct. 20, 1964, Ser. No. 405,263
Claims priority, application Japan, Oct. 30, 1963, 38/57,520; Nov. 27, 1963, 38/63,229
12 Claims. (Cl. 195—28)

This invention relates to a process for the production of adenosine triphosphate (hereinafter referred to as ATP), adenosine diphosphate (hereinafter referred to as ADP), guanosine triphosphate (hereinafter referred to as GTP) and guanosine diphosphate (hereinafter referred to as GDP) by carrying out fermentative cultivation of a microorganism in a culture medium in the presence in such culture medium, for some time during the process of fermentation, of adenine, a derivative thereof (adenosine, etc.), guanine, a derivative thereof (guanosine, etc.) or a natural product containing at least one of these substances (hereinafter called generically "guanine compound" and "adenine compound").

The object of this invention is to produce—economically and in good yields—ATP, ADP, GTP and GDP which play important parts in metabolism and which are important as biochemical reagents, and as addition reagents of high-energy phosphates and drugs.

Heretofore, ATP and ADP were produced by isolation from extracts of organisms or were produced enzymatically by cultivating a large quantity of yeast in a medium containing adenosine and phosphate (Ostern et al., Hoppe-Seyler's Zeitschrift für physiologische Chemie, 251, 258 (1938)). However, the yields in these methods are low and the enzymatic method has the disadvantage of requiring a large quantity of yeast. Thus, there has been no inexpensive method for the production of ATP and ADP and therefore they are in the category of expensive reagents. As for the production of GTP and GDP, this has heretofore been accomplished by chemical synthesis, or by an enzymatic method from guanosine. But the yields are low in these methods, and the enzymatic method again has the disadvantage of requiring a large amount of yeast. Thus, GTP and GDP also are considered to be expensive reagents as there has been no inexpensive method for their production.

According to the present invention, a certain species of microorganism forms a remarkable quantity of ATP, ADP, GTP and GDP and thus establishes an economical process for the production of the said ATP, ADP, GTP and GDP.

The microorganisms used in this invention are those which belong to *Brevibacterium ammoniagenes* category. Any bacteria which belong to this species can be used, irrespective of whether they are wild strains, nutrient-requiring mutants or other mutants. Remarkable quantities of ATP, ADP, GTP and GDP are formed by culturing the bacteria belonging to this species in a medium in the presence of "adenine compound" or "guanine compound" for some time during the culture.

As the culture medium, any one which contains a carbon source such as carbohydrates (glucose, hydrolysis product of starch or molasses, etc.), nitrogen source (urea, ammonium chloride or ammonium nitrate, etc.), inorganic salts (potassium phosphates, magnesium sulfate, calcium chloride, etc.), and natural products containing nitrogen (corn steep liquor, yeast extract, meat extract, peptone, casamino acids, fish solubles, etc.) in appropriate ratio, is employable. When a nutrient-requiring mutant is used, a substance which satisfies the requirement of the mutant is added to the medium. The addition of amino acids and vitamins such as biotin, thiamine, pantothenic acid or substances which have the same physiological significance (for example, β-alanine and coenzyme A in the case of pantothenic acid) is advantageous for the stabilization of the growth of the bacteria and the fermentation and for obtaining the product in good yield.

ATP, ADP, adenylic acid (AMP), GTP and GDP are formed singly or together, when the fermentation is carried out in the presence of "adenine compound" or "guanine compound" which is added to the above-mentioned medium at the beginning of the culture or during the course of the culture. The quantity of ATP, ADP, GTP and GDP formed increases when the concentration of inorganic phosphate added to the medium is higher than 0.4% (by weight), calculated as $PO_4$. The best result is obtained when the concentration of $PO_4$ is between about 0.4% and about 1.6%. Glucose and other nutrients may be added complementarily to the medium during the fermentation. The quantity of "adenine compound" or "guanine compound" added to the medium is preferably about 1 milligram per milliliter to 10 milligrams per milliliter, calculated as adenine or guanine.

The fermentation is performed under aerobic conditions, for example, in shaking culture or submerged culture with stirring and aeration at a temperature betwen 20° C. and 40° C. A remarkable quantity of ATP, ADP, AMP, GTP and GDP is producd in the medium generally after cultivation for 36–120 hours. The yield of ATP, ADP and GTP, GDP increases remarkably, when the culture medium is controlled—e.g. by the addition of a suitable neutralizing agent such, for example, as aqueous sodium hydroxide solution, to maintain the pH value between neutral and slightly acidic (pH 7.5–5.5) after the addition of "adenine compound" or "guanine compound." The formed ATP, ADP, GTP and/or GDP are recovered by means of per se known ion exchange resin treatment, adsorption, precipitation, or extraction after the completion of cultivation.

The following examples illustrate presently preferred embodiments of the invention but are not to be construed as limiting the same. Percentages therein are by weight unless otherwise indicated.

EXAMPLE 1

*Brevibacterium ammoniagenes* ATCC No. 6872 is cultured in a medium containing 2% of glucose, 1% of peptone, 1% of yeast extract, 0.3% of NaCl and 30 micrograms per liter of biotin at 30° C. for 24 hours.

A fermentation medium is inoculated with 10% (by volume) of thus obtained culture.

The fermentation medium has the following composition, the culture being shaking culture performed at 30° C.:

| | |
|---|---|
| Glucose | Grams__ 100 |
| Urea | do____ 6 |
| $KH_2PO_4$ | do____ 10 |
| $K_2HPO_4$ | do____ 10 |
| $MgSO_4 \cdot 7H_2O$ | do____ 10 |
| Yeast extract | do____ 10 |
| Biotin | μgrams__ 30 |
| $CaCl_2 \cdot 2H_2O$ | gram__ 0.1 |

The above components are dissolved in water and made up to one liter, and the pH of the fermentation medium is adjusted to 8.0 with NaOH before sterilization. 20 milliliter-portions of fermentation medium are put in 250 milliliter-Erlenmeyer flasks and used after sterilization in an autoclave for 10 minutes under a pressure of 1 kilogram per square centimeter.

After culturing the inoculated, fermentation medium for 72 hours, such a quantity of adenine is added to the fermentation medium that a concentration of 2 milligrams of adenine per milliliter of fermentation liquid is reached. After further culturing for 24 hours, 2.98 milligrams of ATP per milliliter and 0.85 milligram of ADP per milliliter (both calculated as weights of the free acids) are produced in the culture liquid. The pH value is maintained between neutral and slightly acidic after the addition of the adenine, e.g. by means of NaOH, and is 5.8 at the end of the cultivation.

The filtrate obtained by filtration of this fermentation liquid is passed through a column of a strongly basic anion exchange resin (e.g. Dowex 1 (X2) of chloride type) and the ATP and ADP are obtained by elution with dilute hydrochloric acid. These fractions are neutralized with sodium hydroxide, treated with carbon powder, concentrated and then cooled to obtain the crystals of sodium salts of ATP and ADP respectively.

EXAMPLE 2

*Brevibacterium ammoniagenes* ATCC No. 6871 is used. It is cultured in the same manner as in Example 1, and 0.3 milligram of ATP per milliliter of culture liquid and 0.2 milligram of ADP per milliliter are produced.

EXAMPLE 3

*Brevibacterium ammoniagenes* ATCC No. 6872 is used. It is cultured in the same manner as in Example 1 in a fermentation medium prepared by adding 3 milligrams per liter of thiamine and 3 milligrams per liter of calcium pantothenate to a medium having the same composition as that in Example 1. Adenine is added after 48 hours' cultivation and 1.1 milligrams per milliliter of ATP, 1.4 milligrams per milliliter of ADP and 1.2 milligrams per milliliter of AMP are produced by further 48 hours' cultivation. The pH value at this time is 7.3.

When the pH of the medium is maintained between 6.5 and 5.8 after the addition of adenine under otherwise the same conditions, 2.8 milligrams per milliliter of ATP and 1.1 milligrams per milliliter of ADP are produced together with a small amount of AMP.

EXAMPLE 4

*Brevibacterium ammoniagenes* ATCC No. 6872 is used. It is cultured in a medium containing 2% of glucose, 1% of peptone, 1% of yeast extract, 0.3% of NaCl and 30 μgrams per liter of biotin, at 30° C. for 24 hours.

A fermentation medium is inoculated with 10% (by volume) of thus obtained culture.

The fermentation medium has the following composition, shaking culture being performed at 30° C.:

| | |
|---|---|
| Glucose | grams__ 100 |
| Urea | do____ 6 |
| $KH_2PO_4$ | do____ 10 |
| $K_2HPO_4$ | do____ 10 |
| $MgSO_4 \cdot 7H_2O$ | do____ 10 |
| Biotin | μgrams__ 30 |
| Calcium pantothenate | milligrams__ 2 |

The above components are dissolved in water and made up to one liter, the pH of the fermentation medium being then adjusted at 8.0 with NaOH before sterilization. 20 milliliter-portions of inoculated fermentation medium are put in 250 milliliter-Erlenmeyer flasks and used after addition of $CaCO_3$ in the ratio of 3 grams per 100 milliliters of the medium and after sterilization in an autoclave for 10 minutes under a pressure of 1 kilogram per square centimeter.

After culturing the thus inoculated, fermentation medium for 72 hours, such a quantity of guanine that the concentration of 2 milligrams of guanine per milliliter of fermentation medium is reached is added to the fermentation liquid. After culturing for further 48 hours, 2.0 milligrams of GTP (calculated as free acid) per milliliter is produced in the culture liquid. The pH of the medium after the addition of guanine is maintained between neutral and slightly acidic with e.g. sodium hydroxide, and the pH value at the end of the cultivation is 5.8. (Only 0.26 milligram of GTP per milliliter is produced when guanine is not added and the other conditions are kept the same. The end pH in this case is 6.2.)

The filtrate obtained by removing the bacterial cells from the fermentation liquid is passed through a column of strongly basic anion exchange resin [Dowex 1 (X2) (Cl type)] and the GTP is obtained by elution with dilute hydrochloric acid. This fraction is neutralized with aqueous sodium hydroxide solution, treated with carbon powder, concentrated and cooled to recover the sodium salt of GTP.

EXAMPLE 5

*Brevibacterium ammoniagenes* ATCC No. 6871 is used. 100 grams of glucose, 6 grams of urea, 6 grams of

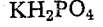

$KH_2PO_4$ 6 grams of $K_2HPO_4$, 6 grams of $MgSO_4 \cdot 7H_2O$ and 5 grams of yeast extract are dissolved in water and made up to one liter. The pH is adjusted to 6.0 and the solution is poured into flasks, $CaCO_3$ added in the ratio of 3 grams per 100 milliliters of solution, and sterilized in an autoclave under a pressure of 1 kg./cm.$^2$ for 10 minutes. Thus prepared medium is used as the fermentation medium. Such a quantity of guanine that the concentration of 2 milligrams of guanine per milliliter is reached is added after 72 hours' culturing, which is then continued for 24 hours after the addition of the guanine. 0.57 milligram of GTP per milliliter and some GDP are formed when the fermentation is carried out under otherwise the same other conditions as in Example 4.

What is claimed is:

1. A process for the preparation of adenosine di- and tri-phosphates which comprises culturing a bacterium of the *Brevibacterium ammoniagenes* species under aerobic conditions in a nutrient medium containing inorganic phosphate in the presence of a member selected from the group consisting of adenine and adenosine until there has been an accumulation of said phosphates in said medium, and recovering the thus-accumulated adenosine di- and tri-phosphates.

2. A process for the preparation of guanosine di- and tri-phosphates which comprises culturing a bacterium of the *Brevibacterium ammoniagenes* species under aerobic conditions in a nutrient medium containing inorganic phosphate in the presence of a member selected from the group consisting of guanine and guanosine until there has been an accumulation of said phosphates in said medium, and recovering the thus-accumulated guanosine di- and tri-phosphates.

3. A process for the preparation of adenosine di- and tri-phosphates which comprises culturing a bacterium of the *Brevibacterium ammoniagenes* species under aerobic conditions in a nutrient medium containing inorganic phosphate which contains a member selected from the group consisting of adenine and adenosine at a temperature between about 20° and 40° C. for a period of about 36–120 hours, whereby an accumulation of said phosphates in said medium is effected, and recovering the thus-accumulated adenosine di- and tri-phosphates.

4. A process for the preparation of guanosine di- and tri-phosphates which comprises culturing bacterium of the *Brevibacterium ammoniagenes* species under aerobic conditions in a nutrient medium containing inorganic phosphate which contains a member selected from the group consisting of guanine and guanosine at a temperature between about 20° and 40° C. for a period of about 36–120 hours, whereby an accumulation of said phosphates in said medium is effected, and recovering the thus-accumulated guanosine di- and tri-phosphates.

5. A process according to claim 3, wherein the culturing comprises a first phase which is carried out in the absence of adenine and of adenosine, and wherein the culturing continues at a pH of about 5.5 to 7.5 after addition of either of the last two compounds to the culture medium.

6. A process according to claim 4, wherein the culturing comprises a first phase which is carried out in the absence of guanine and of guanosine, and wherein the culturing continues at a pH of about 5.5 to 7.5 after addition of either of the last two compounds to the culture medium.

7. A process according to claim 3, wherein the nutrient medium contains between about 0.4% and about 1.6% by weight (calculated as $PO_4$) of inorganic phosphate.

8. A process according to claim 4, wherein the nutrient medium contains between about 0.4% and about 1.6% by weight (calculated as $PO_4$) of inorganic phosphate.

9. A process for the preparation of adenosine di- and tri-phosphates which comprises culturing a bacterium of the *Brevibacterium ammoniagenes* species under aerobic conditions in a nutrient medium containing inorganic phosphate, in the presence of a member selected from the group consisting of adenine and adenosine, in an amount of about 1 milligram to about 10 milligrams of said member per milliliter of nutrient medium, until there has been an accumulation of said phosphates in said medium, and recovering the thus-accumulated adenosine di- and tri-phosphates.

10. A process for the preparation of guanosine di- and tri-phosphates which comprise culturing a bacterium of the *Brevibacterium ammoniagenes* species under aerobic conditions in a nutrient medium containing inorganic phosphate, in the presence of a member selected from the group consisting of guanine and guanosine, in an amount of about 1 milligram to about 10 milligrams of said member per milliliter of nutrient medium, until there has been an accumulation of said phosphates in said medium, and recovering the thus-accumulated guanosine di- and tri-phosphates.

11. A process for the preparation of adenosine di- and tri-phosphates which comprises culturing a bacterium of the *Brevibacterium ammoniagenes* species under aerobic conditions in a nutrient medium containing inorganic phosphate which contains a member selected from the group consisting of adenine and adenosine, in an amount of about 1 milligram to about 10 milligrams of said member per milliliter of nutrient medium, at a temperature between about 20° and 40° C. for a period of about 36–120 hours, whereby an accumulation of said phosphates in said medium is effected, and recovering the thus-accumulated adenosine di- and tri-phosphates.

12. A process for the preparation of guanosine di- and tri-phosphates which comprises culturing a bacterium of the *Brevibacterium ammoniagenes* species under aerobic conditions in a nutrient medium containing inorganic phosphate which contains a member selected from the group consisting of guanine and guanosine, in an amount of about 1 milligram to about 10 milligrams of said member per milliliter of nutrient medium, at a temperature between about 20° and 40° C. for a period of about 36–120 hours, whereby an accumulation of said phosphates in said medium is effected, and recovering the thus-accumulated guanosine di- and tri-phosphates.

References Cited by the Examiner

UNITED STATES PATENTS

| | | | |
|---|---|---|---|
| 2,844,514 | 7/1958 | Movell et al. | 195—28 |
| 3,135,666 | 6/1964 | Hara et al. | 195—28 |

FOREIGN PATENTS 675,023  11/1963  Canada.

A. LOUIS MONACELL, *Primary Examiner.*

A. E. TANENHOLTZ, *Assistant Examiner.*